US010691688B2

(12) United States Patent
Nica et al.

(10) Patent No.: US 10,691,688 B2
(45) Date of Patent: Jun. 23, 2020

(54) CRACKING PAGE-LOADABLE COLUMNS FOR IN-MEMORY DATA MANAGEMENT

(71) Applicant: SAP SE, Walldorf (DE)

(72) Inventors: Anisoara Nica, Waterloo (CA); Peter Bumbulis, Kitchener (CA); Reza Sherkat, Waterloo (CA); Mihnea Andrei, Issy les Moulineaux (FR); Anil K. Goel, Waterloo (CA)

(73) Assignee: SAP SE, Walldorf (DE)

( * ) Notice: Subject to any disclaimer, the term of this patent is extended or adjusted under 35 U.S.C. 154(b) by 242 days.

(21) Appl. No.: 15/186,300

(22) Filed: Jun. 17, 2016

(65) Prior Publication Data

US 2017/0364554 A1    Dec. 21, 2017

(51) Int. Cl.
 *G06F 16/2453* (2019.01)
 *G06F 16/2455* (2019.01)
 *G06F 16/22* (2019.01)

(52) U.S. Cl.
 CPC .... *G06F 16/24534* (2019.01); *G06F 16/2228* (2019.01); *G06F 16/2455* (2019.01)

(58) Field of Classification Search
 CPC ......... G06F 17/30864; G06F 17/30867; G06F 17/30672; G06F 17/3064; G06F 16/24534; G06F 16/2455; G06F 16/2228
 USPC ....................................................... 707/765
 See application file for complete search history.

(56) References Cited

U.S. PATENT DOCUMENTS

| | | | | |
|---|---|---|---|---|
| 9,465,829 | B2 * | 10/2016 | Faerber | G06F 16/221 |
| 2009/0106235 | A1 * | 4/2009 | Tankovich | G06F 17/30864 |
| 2012/0221528 | A1 * | 8/2012 | Renkes | G06F 16/00 |
| | | | | 707/674 |
| 2012/0310934 | A1 * | 12/2012 | Peh | G06F 16/219 |
| | | | | 707/736 |
| 2014/0136473 | A1 * | 5/2014 | Faerber | G06F 16/221 |
| | | | | 707/607 |
| 2014/0222418 | A1 * | 8/2014 | Richtarsky | G06F 17/30312 |
| | | | | 704/10 |
| 2014/0279961 | A1 * | 9/2014 | Schreter | G06F 3/0608 |
| | | | | 707/693 |
| 2014/0279963 | A1 * | 9/2014 | Schreter | G06F 16/23 |
| | | | | 707/693 |
| 2014/0310232 | A1 * | 10/2014 | Plattner | G06F 16/24539 |
| | | | | 707/602 |
| 2015/0142818 | A1 * | 5/2015 | Florendo | G06F 17/30312 |
| | | | | 707/741 |
| 2015/0142819 | A1 * | 5/2015 | Florendo | G06F 17/30312 |
| | | | | 707/741 |

(Continued)

OTHER PUBLICATIONS

Krueger et. al. "Merging Differential Updates in In-Memory Column Store". 2011. DBKDA 2011: The national Conference on Advances in Databases, Knowledge, and Data Applications. IBSN:978-1-61208-115-1. pp. 196-201. (Year: 2011).*

(Continued)

*Primary Examiner* — Michael Pham
(74) *Attorney, Agent, or Firm* — Sterne, Kessler, Goldstein & Fox P.L.L.C.

(57) ABSTRACT

Cracking page-loadable columns for in-memory data management is described herein. An embodiment operates by accessing a column according to a received query, determining that the received query requires a non-critical data structure associated with the column, and rebuilding the non-critical data structure from data associated with the column.

18 Claims, 4 Drawing Sheets

(56) References Cited

U.S. PATENT DOCUMENTS

| | | | | |
|---|---|---|---|---|
| 2015/0278268 A1* | 10/2015 | El-Ali | ............... | G06F 16/2237 |
| | | | | 707/722 |
| 2016/0103914 A1* | 4/2016 | Im | ........................ | H04L 63/20 |
| | | | | 707/770 |
| 2016/0147830 A1* | 5/2016 | Zhong | ............ | G06F 17/30085 |
| | | | | 707/769 |

* cited by examiner

CRACKING PAGE-LOADABLE COLUMNS FOR IN-MEMORY DATA MANAGEMENT

BACKGROUND

Modern in-memory database systems achieve extreme performance for analytical workloads by taking advantages of recent trends in hardware technology, including dynamic random-access memory (DRAM) footprints and the instructional level parallelism of register vector processing offered by, e.g. single instruction, multiple data (SIMD) and AdvancedVector Extensions (AVX) processor capabilities. Further, for in-memory columnar databases, dictionary based compression schemes produce uniform representation and in-memory layout for each column. The memory layout can be optimized for extremely fast basic database operations, such as scan and search. Fundamentally, in-memory systems make a price-performance trade-off that is highly desirable in most enterprise application scenarios. However, with the rapid growth in the variety of applications that want to combine business data with emerging Internet of Things (IoT) and/or social media data, there is a need to also provide very high performance for very large data sets while improving the use of precious main memory for low value or low density data.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, method and/or computer program product embodiments, and/or combinations and sub-combinations thereof, for cracking page-loadable columns for in-memory data management.

Figure 1:
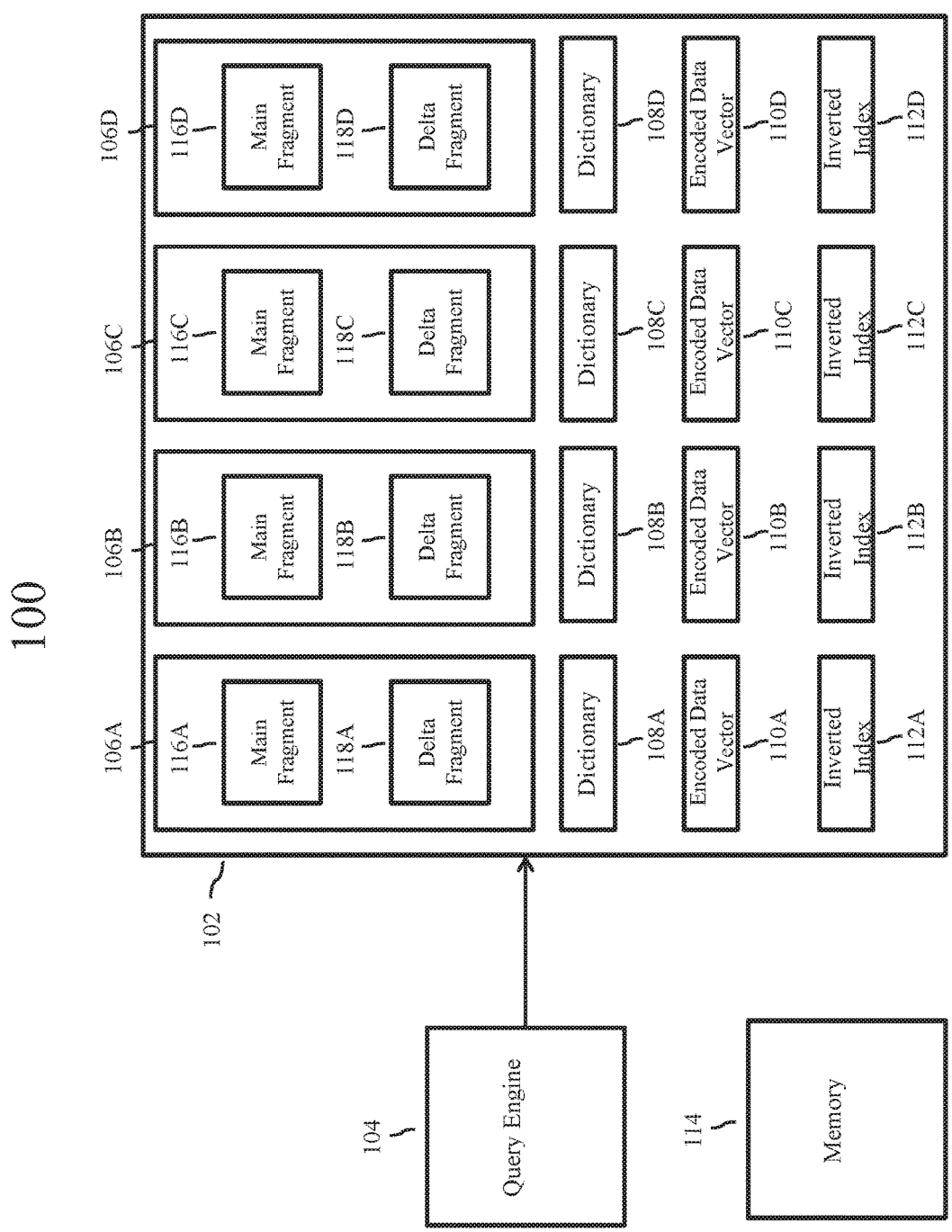
FIG. 1 is a block diagram of an architecture of an in-memory database system 100 that supports page-loadable columns, according to some embodiments.

FIG. 1 is a block diagram of an architecture of an in-memory database system 100 that supports page-loadable columns, according to an embodiment. In-memory database system 100 may comprise unified table 102, query engine 104, and memory 114.

According to an embodiment, unified table 102 may comprise a columnar table comprising a plurality of columns 106 (comprising columns 106A-D), a plurality of dictionaries 108 (comprising dictionaries 108A-D), a plurality of encoded data vectors 110 (comprising encoded data vectors 110A-D), and a plurality of inverted indices 112 (comprising inverted indices 112A-D).

In an embodiment, query engine 104 may process low-level database queries and provide mechanisms to query data from unified table 102. Query engine 104 may process these queries to request, modify, append, or otherwise manipulate or access data in unified table 102. For columns 106 of unified table 102, query engine 104 manages access to dictionaries 108, encoded data vectors 110, inverted indices 112, or any combination thereof—to name a few. According to an embodiment, query engine 104 may comprise access algorithms for page-loadable dictionaries 108, encoded data vectors 110, inverted indices 112, or any combination thereof.

In an embodiment, each column of unified table 102 comprises a read optimized section, or main fragment, and a write-optimized section, or delta fragment. For example, column 106A may comprise main fragment 116A and delta fragment 118A. When query engine 104 processes a change to a column (i.e. insert a new row or update an existing row of a column), the changes may be appended as new row into the delta fragment. For example, query engine 104 may insert a new row into column 06A. This new row may be appended as a new row into delta fragment 118A.

In an embodiment, query engine 104 may perform a delta-merge operation. The delta-merge operation may comprise merging a main fragment and delta fragment of a column so that all committed changes from the delta fragment would be moved into a newly constructed main fragment. For example, during a delta merge operation, the changes appended into delta fragment 118A may be merged with main fragment 116A to create a new main fragment, which may reflect the changes appended to delta fragment 118A.

According to an embodiment, when query engine 104 processes a query, for a column, query engine 104 may process the query for both the main fragment and delta fragment of the column. The results from processing the query on both fragments may then be joined and returned. For example, query engine 104 may process a query to search for data in column 106A. Query engine 104 may traverse main fragment 116A and delta fragment 118A for the data, join the results from the traversal of both fragments, and return the result.

In an embodiment, each of the columns 106 may be associated with one or more data structures, such as dictionaries 108, encoded data vectors 110, inverted indices 112, or any combination thereof—to name a few. For example, column 106A. may be associated with dictionary 108A, encoded data vector 110A, and inverted index 112A.

According to an embodiment, each main fragment of columns 106 is encoded using order-preserving dictionary encoding which assigns a unique value identifier to each value stored in the main fragment. These value identifiers are assigned using the dictionary related to the column. For example, the main fragment of column 106A may be encoded using order-preserving dictionary encoding and would assign unique value identifiers using dictionary 108A.

In an embodiment, encoded data vectors 110 may comprise the value identifier information for the main fragment of an associated column. For example, encoded data vector 110A would comprise the value identifier information for the main fragment of column 106A.

According to an embodiment, inverted indices 112 may comprise data mapping each value identifier to the row positions of an associated encoded data vector that observe that value identifier, i.e, mapping the rows of an associated encoded data vector to a given value identifier. For example, inverted index 112A may comprise data mapping each value identifier found in dictionary 108A to rows of encoded data vector 110A.

In an embodiment, columns 106 may be page loadable. A page loadable column may comprise a column whose main fragment is divided into fractions, or pages, wherein some pages of the main fragment are evicted or never loaded into memory 114 when the column is accessed. This serves to lower the memory footprint of the main fragment as only pages of the main fragment need to be loaded into memory 114 rather than the entirety of the main fragment. According to an embodiment, memory 114 may comprise a read-only memory (ROM), random-access memory (RAM), storage class memory (SCM), or any combination thereof—to name a few.

According to an embodiment, dictionaries 108, encoded data vectors 110, and inverted indices 112 may be page loadable. A page-loadable dictionary, encoded data vector, or inverted index may comprise a data structure divided into fractions, or pages, that are associated with a page of the main fragment of a column. These pages of the data structure are evicted or never loaded into memory 114 when the data structure's associated column is accessed. For example, a page of dictionary 108A may be evicted or never loaded into memory 114 when an associated page of main fragment 116A is accessed. This may serve to lower the memory footprint of the main fragment as only pages of the data structures associated with the main fragment need to be loaded into memory 114.

In an embodiment, unified table 102 may further comprise first and second helper dictionaries associated with paged-loadable dictionaries 108. A first helper dictionary may comprise a value identifier directory for an associated page-loadable dictionary. The value identifier directory may comprise the last value identifiers stored in each page of an associated page-loadable dictionary. For example, a first helper dictionary associated with page-loadable dictionary 108A may comprise the last value identifiers stored in each page of page-loadable dictionary 108A.

According to an embodiment, a second helper dictionary may comprise a value separator directory for an associated page-loadable dictionary. The value separator directory may comprise the last uncompressed value stored in each page of an associated page-loadable dictionary. For example, a second helper dictionary associated with page-loadable dictionary 108A may comprise the last non-encoded value stored in each page of page-loadable dictionary 108A.

Figure 2:
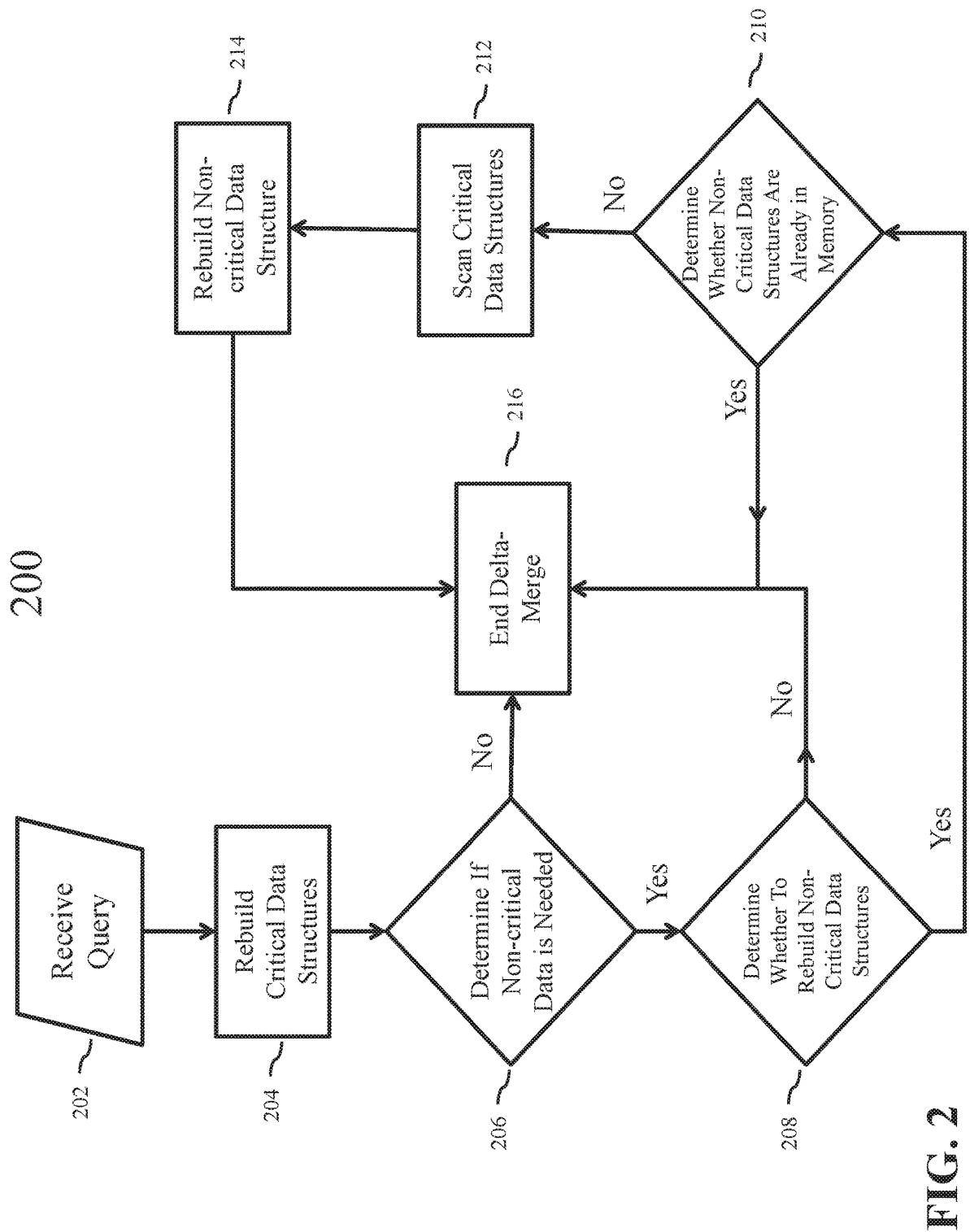
FIG. 2 is a flowchart illustrating a process for selectively rebuilding non-critical data during a delta-merge of a page-loadable column, according to some embodiments.

FIG. 2 is a flowchart illustrating a process for selectively rebuilding non-critical data during a delta-merge process of a page-loadable column, according to some embodiments.

In an embodiment, at block 202, a delta merge process of a page-loadable column starts. At block 204, critical data for the page-loadable column is rebuilt and persisted. The critical data may comprise the data stored in the page-loadable dictionary and page-loadable encoded data vector associated with the page loadable column.

At block 206, query engine 104 may determine whether the immediate workload before the delta-merge operation requires non-critical data for the page-loadable column. The immediate workload before the delta-merge operation may comprise queries performed on the page-loadable column before the delta-merge occurred. Non-critical data may comprise data stored in the page-loadable inverted index associated with the page loadable column and the first and second helper dictionaries associated with the page-loadable dictionary associated with the page-loadable column.

If query engine 104 determines that the immediate workload before the delta-merge operation requires non-critical data, then the system moves to block 208. Otherwise, the system will move to block 216 and the delta-merge operation will end.

At block 208, query engine 104 may determine whether all or part of the data structures comprising non-critical data are to be rebuilt based on the historic usage of the data structures. Rebuilding data structures comprising non-critical data based upon the historic usage may help avoid rebuilding these data structures when they are not necessary, thus lowering the memory footprint and delta merge time.

The historic usage of the data structures may comprise the frequency the data structure was used, the actual data from the data structure used, the types of queries that have accessed the page-loadable column associated with the data structure, or any combination thereof—to name a few. For example, for a column which has always been accessed just by full scan or by set row identifiers, only a first helper dictionary comprising a single value identifier may be needed. If query engine 104 determines that all or part of the data structures comprising non-critical data are to be rebuilt then the system will move to block 210. Otherwise, the system will move to block 216 and the delta-merge operation will end.

At block 210, the delta merge process may check to see if the data structure to be rebuilt has already been loaded into memory 114. If the data structure to be rebuilt has been loaded into memory 114 then the system will move on to block 212, otherwise the system will move to block 216 and the delta-merge operation will end.

At block 212, the delta merge process may scan the critical data needed to rebuild the data structure comprising non-critical data. For example, if it is determined that a page-loadable inverted index related to column 106A needs to be rebuilt, it will scan encoded data vector 110A. At block 214, the delta merge process rebuilds the data structure comprising non-critical data using the data scanned in block 212. For example, inverted index 112A is rebuilt using data scanned from encoded data vector 110A.

Figure 3:
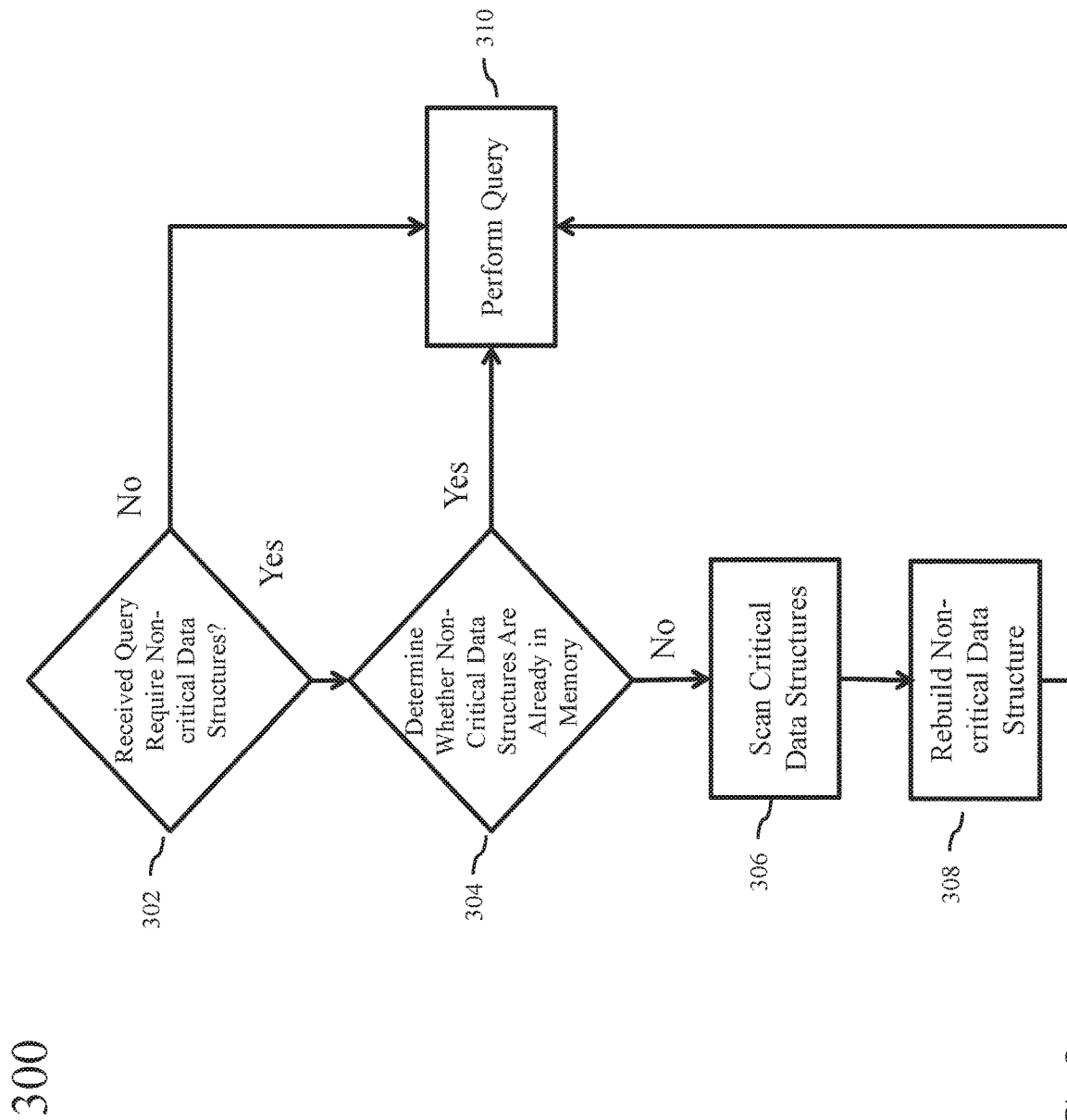
FIG. 3 is a flowchart illustrating a process for dynamically rebuilding non-critical data structures driven by the query being executed, according to some embodiments.

FIG. 3 is a flowchart illustrating a process for dynamically rebuilding non-critical data structures driven by the query being executed, according to some embodiments. By dynamically rebuilding non-critical data structures based on a query being executed, it is possible that only the necessary data structures are rebuilt, lowering the memory footprint.

At block 302, query engine 104 may receive a query and determines whether the query requires page-loadable data structures comprising non-critical data associated with the page-loadable column need to be rebuilt. If query engine 104 determines that the query requires data structures comprising non-critical data to be rebuilt, then the system moves to block 304. Otherwise, the system will move to block 310 and perform the query. For example, the query may be a point query, in which case query engine 104 would determine that all data structures comprising non-critical data related to the page-loadable column are needed.

At block 304, query engine 104 may check to see if the data structure to be rebuilt has already been loaded into memory 114. If the data structure to be rebuilt has been loaded into memory 114 then the system will move on to block 306, otherwise the system will move to block 310 and perform the query.

At block 306, query engine 104 may scan the critical data needed to rebuild the data structure comprising non-critical data. For example, if query engine 104 determines that a first helper dictionary related to dictionary 108A needs to be rebuilt, it will scan dictionary 108A. At block 308, query engine 104 rebuilds the data structure comprising non-critical data using the data scanned in block 310. For example, query index 104 may rebuild a first helper dictionary using data scanned from dictionary 108A. The system may then move to block 310 and perform the query.

Figure 4:
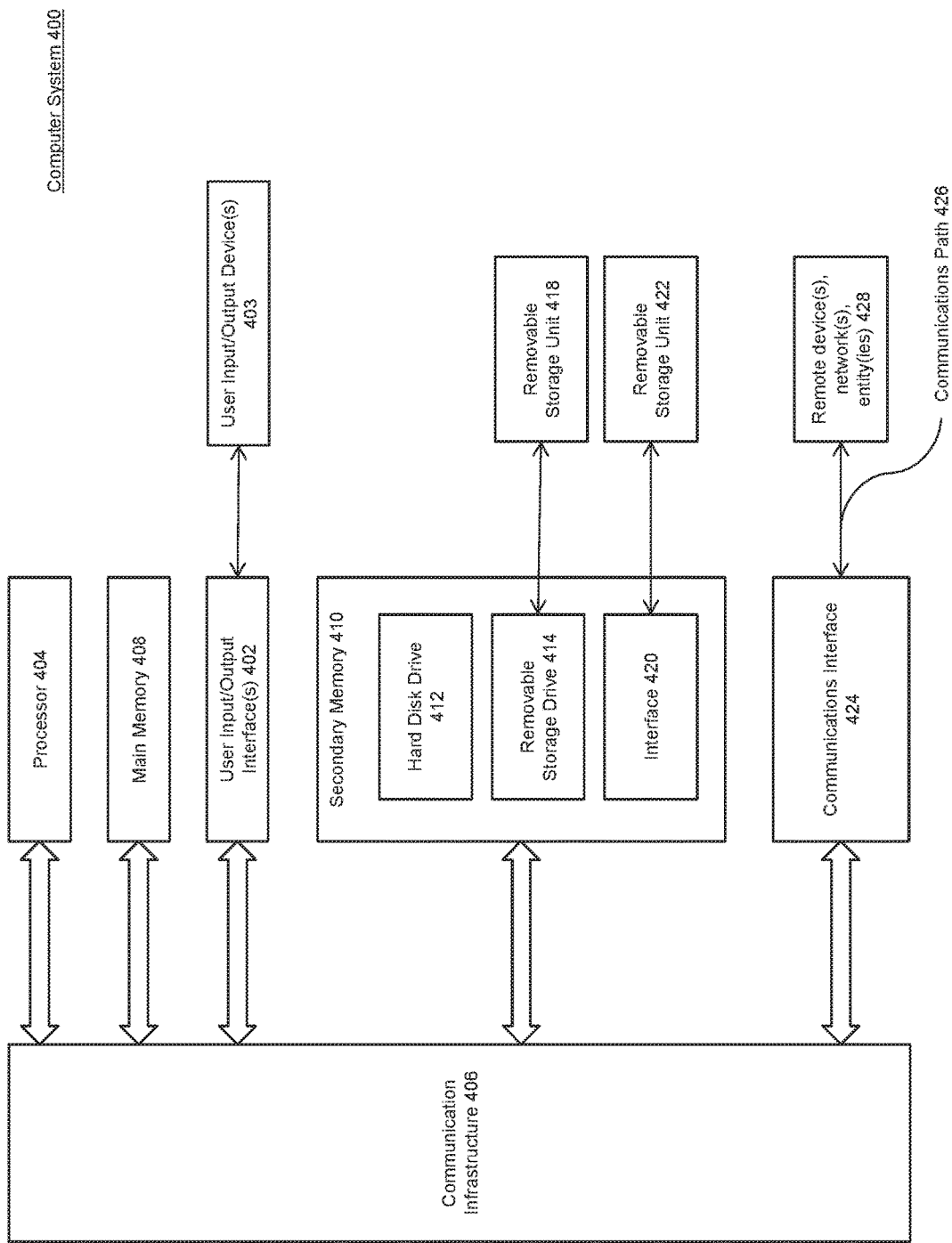
FIG. 4 is an example computer system useful for implementing various embodiments.

Various embodiments can be implemented, for example, using one or more well-known computer systems, such as computer system 400 shown in FIG. 4. For example, computer system 400 can rebuild and persist critical and non-critical data. Computer system 400 can further determine when a query requires a non-critical data structure. Computer system 400 can be any computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not he limited by any of the above-described exemplary embodi-

What is claimed is:

1. A method, comprising:
beginning a delta-merge process for data of a column including both critical data stored in a page-loadable dictionary and non-critical data stored in a page-loadable inverted index;
determining, by at least one processor, that an immediate workload before the delta-merge process requires at least a portion of the non-critical data;
determining a historic usage of the non-critical data comprising a frequency of how often the non-critical data was used, and including which types of queries have previously accessed the page-loading dictionary associated with the column;
determining which portion of the non-critical data is to be rebuilt based on the historic usage, wherein at least one portion of the non-critical data is not rebuilt, and wherein the portion that is to be rebuilt is determined to be used more frequently than the at least one portion that is not rebuilt based on the historic usage; and
rebuilding, by the at least one processor, the determined portion of the non-critical data from data associated with the column based upon the determination that the immediate workload before the delta-merge process requires at least a portion of the non-critical data, wherein upon a completion of the delta-merge process the page-loadable dictionary includes both the critical data and the rebuilt determined portion of the non-critical data.

2. The method of claim 1, further comprising:
scanning, by at least one processor, data associated with the column.

3. The method of claim 1, wherein the non-critical data may comprise an inverted index.

4. The method of claim 1, the determining which portion comprises:
determining, by at least one processor, that a past workload requires the non-critical data associated with the column.

5. The method of claim 1, wherein the column comprises a page-loadable column.

6. The method of claim 5, wherein the non-critical data is stored in a page-loadable data structure.

7. The method of claim 1, wherein a helper dictionary comprises a value identifier dictionary storing one or more least value identifiers stored in each page of an associated page-loadable dictionary.

8. The method of claim 1, wherein the rebuilding comprises accessing a first helper dictionary comprising a single value identifier.

9. The method of claim 1, wherein the rebuilding comprises:
rebuilding the critical data as part of the delta merge process.

10. A system, comprising:
a memory; and
at least one processor communicatively coupled to the memory and configured to:
begin a delta-merge process for data of a column including both critical data stored in a page-loadable dictionary and non-critical data stored in a page-loadable inverted index;
determine, by at least one processor, that an immediate workload before the delta-merge process requires at least a portion of the non-critical data;
determine a historic usage of the non-critical data comprising a frequency of how often the non-critical data was used, and including which types of queries have previously accessed the page-loading dictionary associated with the column;
determine which portion of the non-critical data is to be rebuilt based on the historic usage, wherein at least one portion of the non-critical data is not rebuilt, and wherein the portion that is to be rebuilt is determined to be used more frequently than the at least one portion that is not rebuilt based on the historic usage; and
rebuild the determined portion of the non-critical data from data associated with the column based upon the determination that the immediate workload before the delta-merge process requires at least a portion of the non-critical data, wherein upon a completion of the delta-merge process the page-loadable dictionary includes both the critical data and the rebuilt determined portion of the non-critical data.

11. The system of claim 10, the at least one processor further configured to:
scan data associated with the page-loadable column.

12. The system of claim 10, wherein the non-critical data comprises a helper dictionary.

13. The system of claim 10, wherein to determine which portion, the at least one processor is configured to:
determine that a past workload requires the non-critical data associated with the column.

14. The system of claim 10, wherein the non-critical data is stored in a page-loadable data structure.

15. A tangible, non-transitory computer-readable device having instructions stored thereon that, when executed by at least one computing device, causes the at least one computing device to perform operations comprising:
beginning a delta-merge process for data of a column including both critical data stored in a page-loadable dictionary and non-critical data stored in a page-loadable inverted index;
determining, by at least one processor, that an immediate workload before the delta- merge process requires at least a portion of the non-critical data;
determining a historic usage of the non-critical data comprising a frequency of how often the non-critical data was used, and including which types of queries have previously accessed the page-loading dictionary associated with the column;
determining which portion of the non-critical data is to be rebuilt based on the historic usage, wherein at least one portion of the non-critical data is not rebuilt, and wherein the portion that is to be rebuilt is determined to be used more frequently than the at least one portion that is not rebuilt based on the historic usage; and
rebuilding, by the at least one processor, the determined portion of the non-critical data from data associated with the column based upon the determination that the immediate workload before the delta-merge process requires at least a portion of the non-critical data, wherein upon a completion of the delta-merge process the page-loadable dictionary includes both the critical data and the rebuilt determined portion of the non-critical data.

16. The non-transitory computer-readable device of claim 15, the operations further comprising:
scanning data associated with the column.

17. The non-transitory computer-readable device of claim 16, wherein the non-critical data may comprise an inverted index.

18. The non-transitory computer-readable device of claim 15, wherein the column comprises a page-loadable column, and wherein the non-critical data is stored in a page-loadable data structure.

* * * * *